Patented Jan. 16, 1951

2,537,983

UNITED STATES PATENT OFFICE 2,537,983

ELECTRICAL INSULATING AND POTTING COMPOSITION

Philip J. Franklin, Los Angeles, Calif., assignor to the United States of America as represented by the Secretary of the Army No Drawing. Application November 17, 1949, Serial No. 128,021

2 Claims. (Cl. 106—191)

(Granted under the act of March 3, 1883, as amended April 30, 1928; 370 O. G. 757)

This invention relates to thermoplastic compositions especially suitable for use as electrical insulating material in potting or insulating electrical or electronic devices used in high and ultra-high frequency electrical circuits.

This application is filed under the act of March 3, 1883, as amended April 30, 1928, and the invention described herein may be manufactured and used by or for the Government for governmental purposes without the payment to me of any royalty thereon.

Among the objects of the present invention is the provision of a composition of matter suitable for use as a potting or electrical insulating material for components of high and ultra-high frequency circuits and having the following characteristics: (a) good chemical and physical stability, (b) meltable after preparation or use without change in chemical or physical properties, (c) excellent electrical insulating properties, (d) high melting point, (e) exceptionally hard at elevated temperatures, (f) extremely tough at low temperatures, and (g) high impact strength even at low temperatures.

The essential ingredients of a composition of matter according to the present invention are: natural or synthetic ceresin (melting point 70 to 75° C.) beeswax (melting point 60.5 to 62° C.), and ethyl cellulose, preferably of the N50 grade. The percentage by weight of these ingredients in the composition may vary within certain limits, as will be understood by the person skilled in the art from succeeding portions of this description wherein the general purpose of use of each ingredient is given. The ceresin is used on account of its very favorable electrical properties as an electrical insulator of components of high and ultra-high frequency circuits. In this respect it is more advantageous than beeswax. However, when ceresin is used as such under conditions where it will experience high temperatures or shock, it is deficient as regards melting point and toughness. The ethyl cellulose is employed in the composition of the present invention to impart toughness and to fix its melting point at a desired high value above the melting points of ceresin and beeswax. However, ethyl cellulose does not dissolve in molten ceresin, and it is on this account that beeswax is used as an ingredient. Beeswax in addition to possesing favorable electrical insulating properties in high and ultra-high frequency circuits, although not as favorable as ceresin, has the property when melted of dissolving ethyl cellulose, and it retains this property even when melted together with ceresin to form a homogeneous liquid of a mutual solution of ceresin and beeswax. The beeswax, therefore, enables the ethyl cellulose to be brought into solution in the molten solution of beeswax and ceresin. Because ceresin has more favorable electrical properties than beeswax in high and ultra-high frequency circuits, its proportion should in general be made as high as possible consistent with the necessary proportion of beeswax required to bring into solution the proportion of ethyl cellulose employed to obtain the desired toughness and melting point of the composition. Thus, the ingredients of the composition may be employed in the following indicated percentages by weight: ceresin, from 10 to 30 per cent inclusive; beeswax 55 to 65 per cent inclusive; and ethyl cellulose 15 to 25 per cent inclusive.

The composition is prepared as follows: The ceresin and beeswax are placed together in a vessel in which they may be melted by the application of heat. Heat is applied until a temperature of about 175° C. of the mixture of ceresin and beeswax is attained. During the application of heat, the ceresin and beeswax are continually stirred. When the temperature of the mixture of ceresin and beeswax has attained the above mentioned 175° C. point and both of the said ingredients completely melted, the application of heat is so regulated as to maintain this temperature approximately fixed, whereupon the ethyl cellulose is slowly added while the stirring is continued. When the ethyl cellulose has become thoroughly dissolved in the molten mixture of ceresin and beeswax, the resulting composition is cooled or allowed to cool to a temperature of about 140° C. at which time it is ready to be used as a potting material or insulator for electrical or electronic devices of high or ultra-high frequency circuits. If desired the composition may be cooled or allowed to cool until it solidifies. It is a solid at normal room temperature. After such solidification it may be remelted and used at a temperature of about 140° C.

A preferred composition prepared according to the present invention consists essentially of the following ingredients in their indicated proportions: ceresin about 20 per cent by weight, beeswax about 60 per cent by weight, and ethyl cellulose N50 grade about 20 per cent by weight. These ingredients in their indicated proportions are compounded as described above. The resulting composition is stable and may be remelted from its solid state at room temperature and used again as is usual with waxes. It is hard at plus 60° C. and is extremely tough at minus 40° C. Its impact strength is 80 inch ounces by the falling ball method at minus 40° C. The softening point by the ring and ball method is plus 107° C. and it has excellent electrical insulating properties for electrical and electronic devices used in high and ultra-high frequency circuits.

The ethyl cellulose N50 grade referred to in this specification is well known commercially. "N" type ethyl cellulose is one which contains 46.8% to 48.5% ethoxyl by weight. The numeral "50" indicates that a 5% by weight solution of ethyl cellulose in 80:20 toluene-ethanol has a viscosity of 50 centipoise. In this test the ethyl cellulose is dried 30 minutes at 100° C. before weighing. This material may be obtained from either the Hercules Powder Company, Wilmington, Delaware, or the Dow Chemical Company, Midland, Michigan.

What is claimed is:

1. An electrical insulating and potting composition consisting by weight essentially of from 10 to 30 per cent of ceresin, from 55 to 65 per cent of beeswax, and from 15 to 25 per cent of ethyl cellulose.

2. An electrical insulating and potting composition consisting by weight essentially of about 20 per cent ceresin, about 60 per cent beeswax, and about 20 per cent ethyl cellulose.

PHILIP J. FRANKLIN.

REFERENCES CITED

The following references are of record in the file of this patent:

UNITED STATES PATENTS

| Number | Name | Date |
|---|---|---|
| 2,337,939 | Sermattei | Dec. 28, 1943 |